United States Patent [19]

Smith, Jr. et al.

[11] Patent Number: 5,725,068

[45] Date of Patent: Mar. 10, 1998

[54] SPEED LIMITING DEVICE FOR UTILITY VEHICLES

[75] Inventors: Theodore C. Smith, Jr., Wayne, Pa.; Carl Keith, Bruce, Wis.

[73] Assignee: Smithco, Inc., Wayne, Pa.

[21] Appl. No.: 726,903

[22] Filed: Oct. 7, 1996

[51] Int. Cl.⁶ .................... B60K 23/00; B60K 31/00
[52] U.S. Cl. .................... 180/307; 180/336; 172/3; 56/10.2 R; 74/473 R; 74/526
[58] Field of Search .................... 180/315, 336, 180/307, 305, 271, 287, 14.6, 14.5; 172/3, 2; 56/10.2 R; 74/473 R, 474, 526

[56] References Cited

U.S. PATENT DOCUMENTS

| | | | |
|---|---|---|---|
| 1,117,263 | 11/1914 | Shute | 172/3 |
| 2,524,206 | 10/1950 | Orendorff | 172/3 |
| 4,582,141 | 4/1986 | Van Der Lely | 180/307 |

*Primary Examiner*—Peter C. English
*Attorney, Agent, or Firm*—Joel D. Skinner, Jr.; Skinner and Associates

[57] ABSTRACT

A speed limiting device for a vehicle equipped with a deployable utility device such as a bunker rake. An adjustable mechanical linkage connects a limiting mechanism to the deployable utility device such that when the utility device is deployed, the limiting mechanism is positioned to stop rotation of a pivoting member which controls the output of the power source, such as a hydrostatic drive. The adjustable linkage provides adjustment of the stop position and, therefore, the maximum speed of the vehicle when the utility device is deployed. When the utility device is in the non-deployed position, the limiting mechanism is positioned such that it does not inhibit the motion of the pivoting member, and the vehicle can be operated over its entire speed range.

16 Claims, 4 Drawing Sheets

SPEED LIMITING DEVICE FOR UTILITY VEHICLES

BACKGROUND OF THE INVENTION

1. Field of the Invention

The present invention relates, generally, to mechanical devices. More particularly, the invention relates to speed limiting devices for maintenance vehicles. The invention has particular utility in limiting the ground speed of vehicles which use hydrostatic drives such as those used to maintain sand traps and other features of golf courses. However, the invention also may be found to have utility in other applications.

2. Background Information

Natural outdoor facilities are used to play many sports such as football, baseball, soccer, and golf. Preparing and maintaining the playing fields for each of these sports is an important job, especially when the facilities are used for professional sports. Football, baseball, or soccer fields, require a good mowing, rolling, and patching. Dirt sections must have the proper compaction and smoothness. Lines must be straight and accurate. A golf course has specific course features of greens, fairways, and sand traps or bunkers along with many natural features including hills, creeks, lakes, and trees. Each of these course features must be maintained in a meticulous, consistent manner for golf to be properly played. Greens must be of a particular type of grass that is mowed short and rolled smooth. Fairway grass should be uniform height and thickness, rough should be just that—rough. Bunkers must be of the proper density and texture. All these facilities should be kept clear of leaves and other debris.

As a result of these exacting maintenance requirements and the large scale of the jobs, a number of specialized machines have been developed to perform specific tasks. There are numerous turf mowers and rollers, leaf sweepers, dirt smoothers, line makers and bunker rakes, all intended to help people meet the requirements of a particular maintenance task. But people can also misuse these machines.

One particular machine which has constantly been a source of frustration to golf course management is the bunker rake. The sand in a bunker, or sand trap should have a certain firmness, and the surface should have a particular uniform texture. This is accomplished by a using a vehicle resembling a garden tractor which has the bunker rake attached to the rear of it. To rake a bunker, the bunker rake is lowered and pulled along the sand behind the vehicle. When the vehicle travels from one bunker to another, the rake is raised to clear the ground.

To achieve the proper surface finish on the sand in the bunker, the rake must be dragged on the sand at a certain speed which is relatively slow. But because there are many sand traps on a golf course, and they are often far apart, the tractor vehicle has at least one faster speed to save time in traveling between bunkers. The problem arises when the operator uses the fast speed when raking the bunker. This is a common occurrence, especially when the operators of these vehicles tend to be young employees who may not appreciate the need for the slow speed in the bunker. Dragging the bunker rake too fast makes the surface too irregular. While golf course maintenance supervisors can properly train a young employee and tell them the importance of driving slow when raking bunkers, it seems impossible to curb the tendency of employees to drive fast in the bunkers.

Despite the need for a device that forces the operator of a bunker rake to go slowly when raking a bunker, none insofar as is known has been developed. Accordingly, it is an object of the present invention to provide a device which adjustably limits the speed a vehicle can be driven when a bunker rake is deployed.

It is a further object of this invention to provide a device which can adjustably limit the speed of a vehicle propelled by a hydrostatic drive.

BRIEF SUMMARY OF THE INVENTION

The operator of a vehicle equipped with an apparatus of the present invention controls the speed of the vehicle by a foot pedal attached to a cable which is attached to one end of a shift arm. The shift arm is attached to a rotating sleeve which controls the power output of a hydrostatic drive. As the foot pedal is depressed, the arm and sleeve pivot, thereby increasing the speed of the vehicle. The present invention provides a limiting mechanism such that when the limiting mechanism is in its deployed position, it provides a stop against which the shift arm engages, thereby limiting the rotation of the shift arm and, hence, the speed of the vehicle. The present invention includes an adjustable mechanical linkage connecting the limiting mechanism to an apparatus such as a bunker rake lift mechanism. When the bunker rake is down, the limiting mechanism is in its deployed position to limit the speed of the vehicle. When the rake is up, the limiting arm is pivoted out of the way so the shift arm can travel freely over its full range, thereby allowing the vehicle to travel at its full range of speeds.

This device can be used with other deployable utility devices such as athletic field conditioners, mowers, sprayers or any other apparatus where a maximum speed limitation is desirable.

The features, benefits and objects of this invention will become clear to those skilled in the art by reference to the following description, claims and drawings.

DETAILED DESCRIPTION

Figure 1:
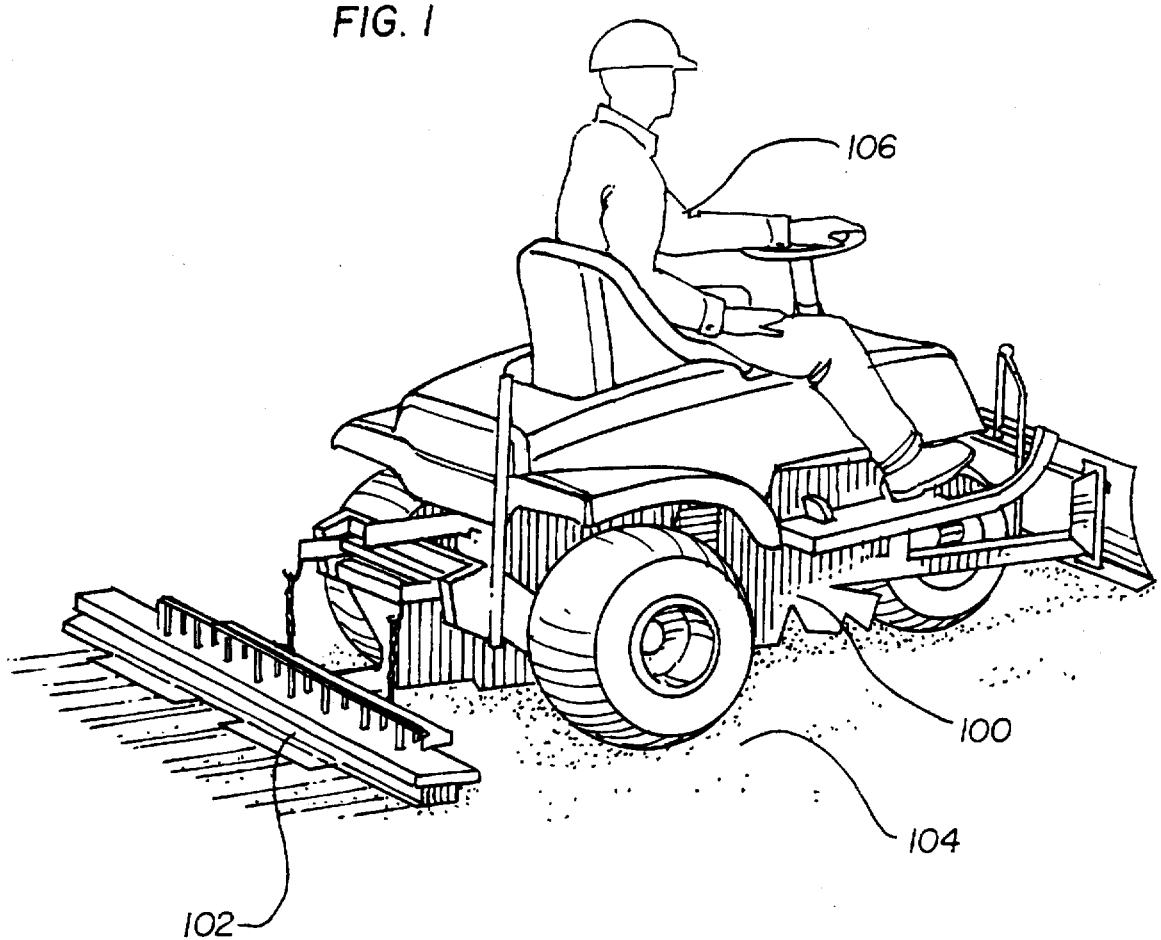
FIG. 1 is a perspective view of a utility vehicle with an attached bunker rake deployed.

Referring to FIG. 1, the typical use for a device of the present invention is on a utility vehicle 100 which uses a bunker rake 102 to condition sand 104 in a bunker of a golf course. The operator 106 lowers bunker rake 102 behind utility vehicle 100 to contact sand 104 as utility vehicle 100 is driven forward at an optimum speed. When sand conditioning is completed, operator 106 raises bunker rake 102 off sand 104 and drives to the next destination, often at a faster speed.

A device of the present invention can be used with other deployable utility devices such as athletic field conditioners, mowers, sprayers or any other apparatus where a maximum speed limitation is desirable.

Figure 2:
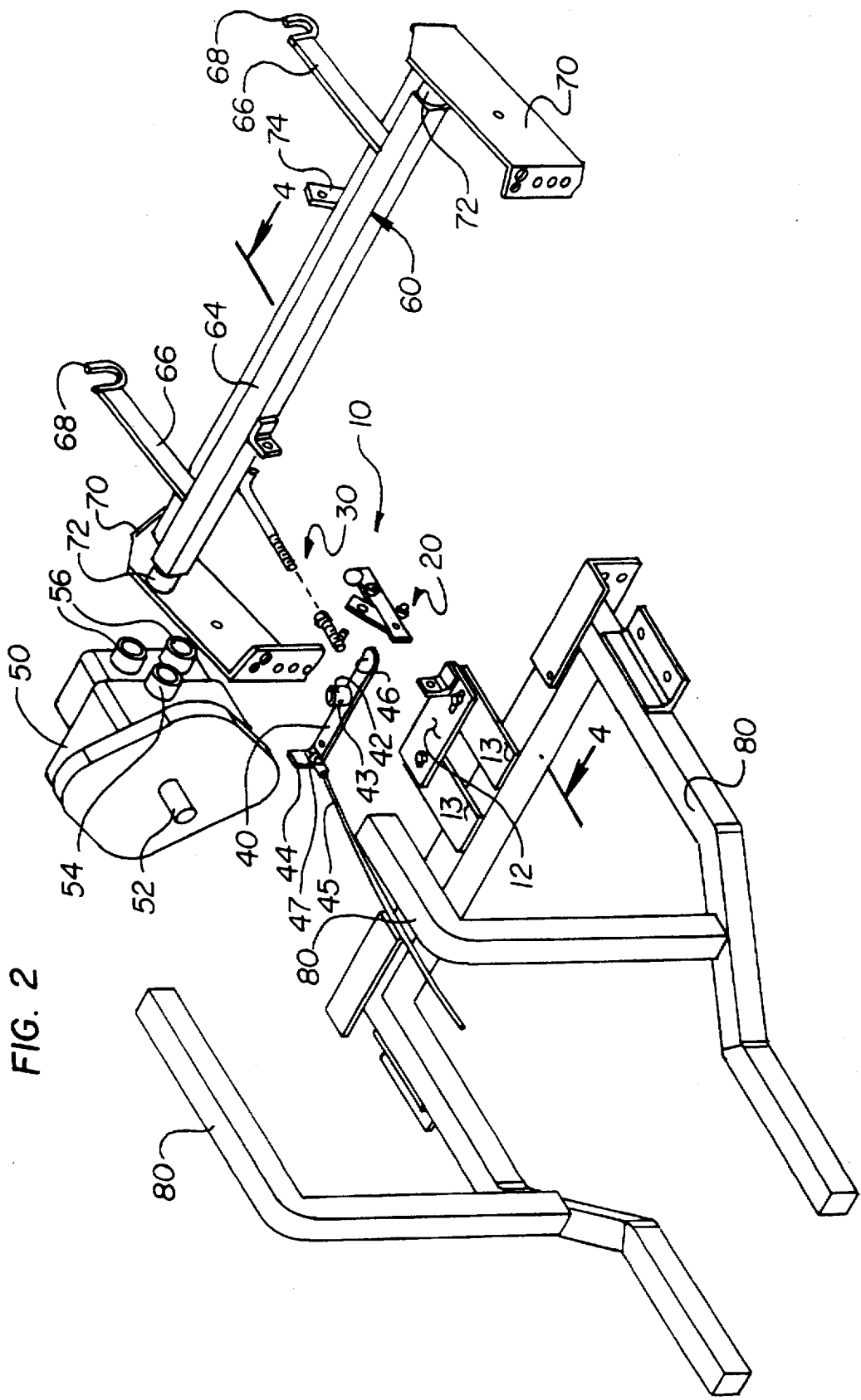
FIG. 2 is a partially exploded perspective view of the speed limiting assembly as used with a bunker rake.

Referring to FIG. 2, an example of the preferred embodiment of the present invention is illustrated and generally indicated by the reference numeral 10. The speed limiting assembly 10 is shown installed on a vehicle having a rake lift assembly 60, but speed limiting assembly 10 may be used in conjunction with any deployable apparatus. Rake lift assembly 60 is attached to the rear of the vehicle by frame members 70. The rake elements (not shown) which drag in the sand hang from chains (not shown) which attach to hooks 68 at the end of arms 66 which are connected to pivoting beam 64. The rake elements are raised or lowered by pulling or pushing a linkage (not shown) which is attached to lug 74 which causes pivoting beam 64 to rotate in bushings 72 attached to frame members 70.

The vehicle has a frame 80 which supports a power source (not shown) such as a gasoline engine or electric motor. The power source is connected to a drive shaft 52 of a hydraulic pump 50. Inlet port 54 on pump 50 receives hydraulic fluid from a hose (not shown) connected to a hydraulic reservoir (not shown). Ports 56 on pump 50 conduct hydraulic fluid into hoses (not shown) which convey the hydraulic fluid to a hydrostatic drive (not shown) which provides torque to the wheels (not shown) of the vehicle. The speed of the vehicle is controlled by valving (not shown) in pump 50 which controls the volume of hydraulic fluid flowing through outlet ports 56. The speed control valving in pump 50 is controlled by a rotatable shaft 58 (shown in FIGS. 4 and 5) to which sleeve 42 with shift lever 40 is attached Sleeve 42 has a hole 43 which aligns with a hole (not shown) in shaft 58 and receives a roll pin (not shown) which causes sleeve 42 and shaft 58 to rotate together.

Shift lever 40 has a bent end 44 to which one end of a cable 45 is attached, preferably with a ball joint 47. The other end of cable 45 is attached to a foot pedal (not shown). Sleeve 42 is attached to shift lever 40 and to the control valving of the pump 50. When the foot pedal is depressed, cable 45 pulls bent end 44 of shift lever 40 forward causing sleeve 42 to rotate, thereby causing valving in the pump 50 to cause more fluid to flow through ports 56, which causes more torque to be delivered to the wheels, and the vehicle to go faster.

Shift lever 40 also has a straight end 46 which moves rearward when bent end 44 moves forward. Speed limiting assembly 10 provides a stop against which straight end 46 of shift arm 40 contacts thereby limiting the rotation of sleeve 42 and, hence, the speed of the vehicle.

Figure 3:
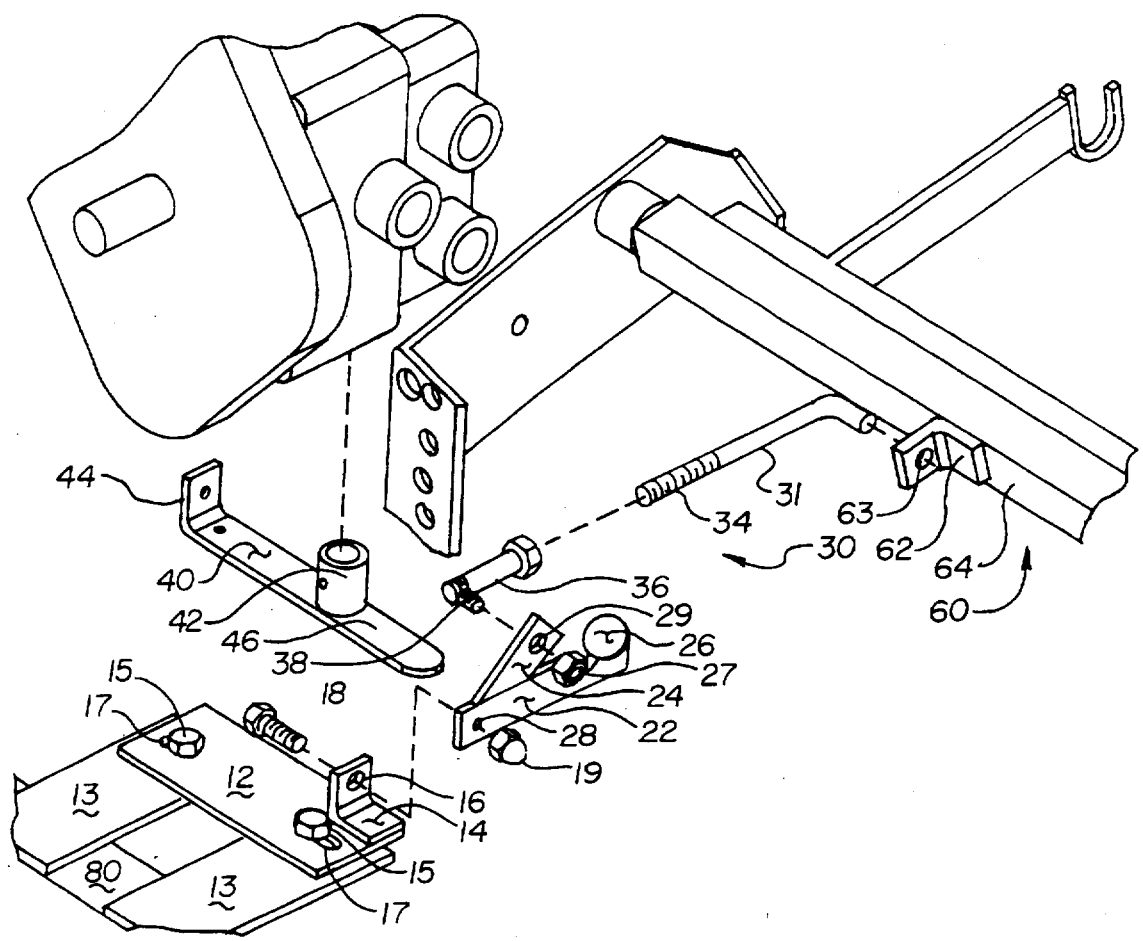
FIG. 3 is an enlarged view of the speed limiting assembly of FIG. 2.

Referring to FIG. 3, speed limiting assembly 10 generally comprises a mounting base 12, a limiting arm assembly 20, and an adjustable linkage assembly 30.

In the preferred embodiment, mounting base 12 is a metal plate attached by bolts 15 to extension plates 13 which are welded to frame 80. Extension plates 13 provide the correct location for mounting base 12 to properly position limiting arm assembly 20. Slots 17 in mounting base 12 engage bolts 15 and allow mounting base 12 to moved laterally to properly position limiting arm assembly 20 laterally. Angle bracket 14 is attached to mounting base 12 by means such as bolting, riveting, or welding. Angle bracket 14 has a hole 16 which receives a pivot element 18 such as a bolt or pin.

Figure 5:
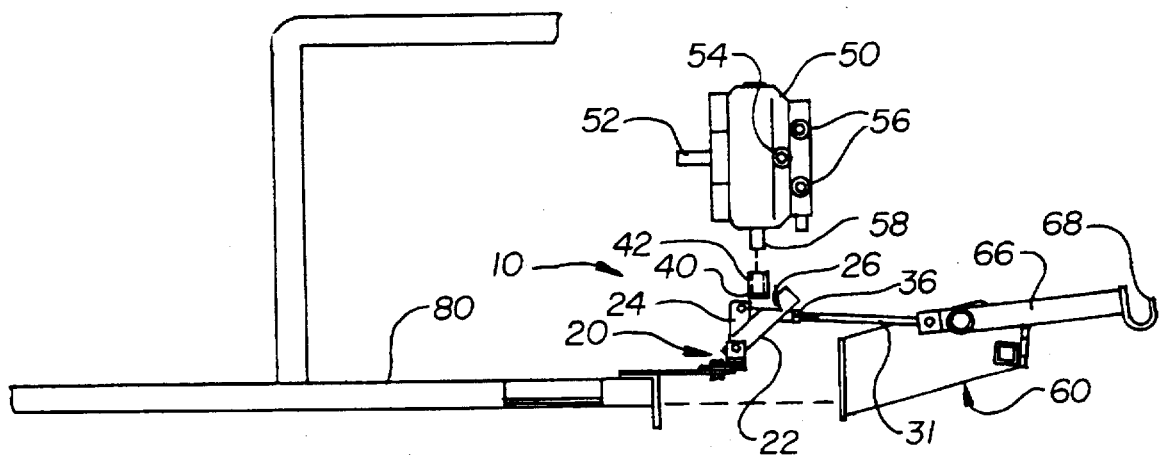
FIG. 5 is a view along line 4—4 of FIG. 2 when the bunker rake is in a deployed position.

Limiting arm assembly 20 comprises a limit or limiting arm 22, a lever or lever arm 24, and a stop pad 26. Limit arm 22 has a hole 28 which receives pivot element 18. Limiting arm assembly then pivots on pivot element 18. In the preferred embodiment pivot element 18 is a bolt which has a nut 19 which restrains limit arm 22 on pivot element 18. Lever 24 extends at an angle from limit arm 22 and has a hole 29 which receives end 38 of adjustable linkage assembly 30. Lever 24 is attached to limit arm 22 in the preferred embodiment by means such as welding, and the angle between limit arm 22 and lever 24 is approximately 38 degrees. In the preferred embodiment stop pad 26 is a metallic disc attached to limit arm 22 near the end opposite hole 28. Stop pad 26 is oriented so that a plane through it is normal to a plane through limit arm 22. Stop plate 26 is also oriented slanted up with respect to the longitudinal direction of limit arm 22 such that when limiting arm assembly 20 is in a deployed position, as shown in FIG. 5, stop pad 26 is in line with and approximately normal to the plane of rotation of shift lever 40. As shift lever 40 rotates to increase the speed of the vehicle, straight end 46 of shift arm 40 contacts stop pad 26 thereby limiting the maximum speed. In the preferred embodiment, the slant angle is approximately 40 degrees, and stop plate 26 is attached to a notch 27 in limit arm 22 by a means such as welding.

Adjustable linkage assembly 30 comprises a linkage rod 31 having a bent end 32 which is received by, and pivots in, hole 63 in angle bracket 62 which is attached to pivoting beam 64 of rake lift assembly 60. In the preferred embodiment, linkage rod 31 also has an end 34 which has external threads which cooperate with internal threads in adjustment element 36. Alternatively, both linkage rod 31 and adjustment element 36 may have external threads suitable for use with a turnbuckle for adjusting the length of linkage assembly 30. Other mechanisms such as a locking slide, or rack and pinion may also be suitable as an adjustment mechanism for linkage assembly 30.

Adjustment element 36 has a cylindrical end 38 generally normal to the longitudinal direction of adjustment element 36. Cylindrical end 38 is received by, and pivots in, hole 29 in lever 24 of limiting arm assembly 20. A retainer element 39 retains cylindrical end 38 in hole 29. In the preferred embodiment, cylindrical end 38 is threaded and the retainer element is a nut. Cylindrical end 38 could also be a smooth pin and retainer element 39 could be an element such as a cotter pin received in a through aperture or snap ring engaged in an external groove. Rather than end 38 being a cylindrical element normal to adjustment element 36, end 38 may be a connecting device, such as a clevis, attached to adjustment element 36.

Figure 4:
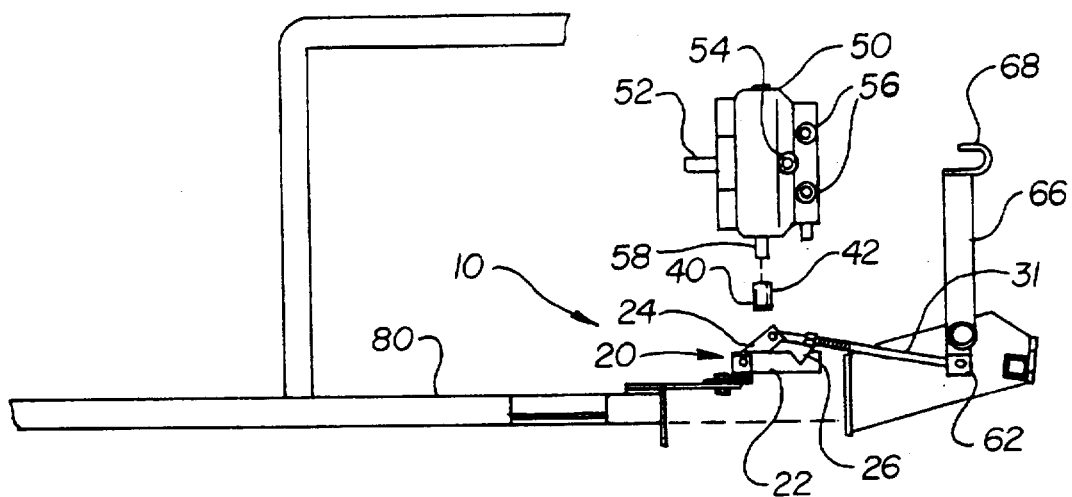
FIG. 4 is a view along line 4—4 of FIG. 2 when the bunker rake is in a retracted position.

Referring to FIGS. 4 and 5, the operation of speed limiting assembly 10 is shown when the rake lift assembly 60 has the rake raised (FIG. 4) and when it has the rake lowered (FIG. 5).

Referring to FIG. 4, when the rake lift assembly raises the rake, arms 66 with hooks 68 are pivoted up and angle bracket 62 is pivoted down which pulls linkage rod 31 rearward, which in turn pulls the limiting arm assembly 20 of limit arm 22, lever 24, and stop pad 26 rearward and downward so it is out of the field of motion of shift lever 40. In this position shift lever 40 can be moved through its full range to allow the vehicle to travel at its full speed range.

Referring to FIG. 5, when the rake lift assembly lowers the rake, arms 66 with hooks 68 are pivoted down and angle bracket 62 is pivoted up which pushes linkage rod 31 forward, which in turn pushes the limiting arm assembly 20 of limit arm 22, lever 24, and stop pad 26 forward and upward so that stop pad 26 limits the motion of shift lever 40, and thereby limits the maximum speed of the vehicle.

The maximum speed of a vehicle with the rake lowered is adjustable by lengthening or shortening adjustable linkage assembly 30, which is accomplished by rotating adjustment element 36 with respect to rod 31. When the adjustable linkage assembly 30 is made longer, stop pad 26 is moved forward which forces shift lever 40 to contact it earlier, thereby reducing the maximum speed of the vehicle. Likewise, when the adjustable linkage assembly 30 is made shorter, the maximum speed increases. Adjustable linkage assembly 30 can be set to achieve the desired speed, then tamper resistant means can be applied to prevent unauthorized people from changing the setting. Such means may include sealants, crimped retainers, or fasteners which require special tools to remove.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim is expressed as a means or step for performing a specified function it is intended that such claim be construed to cover the corresponding structure, material, or acts described in the specification and equivalents thereof, including both structural equivalents and equivalent structures.

What is claimed is:

1. A device for limiting the speed of a utility vehicle, comprising:
   (a) a limiting member;
   (b) a linkage having an adjustable length, a first end attached to said limiting member and a second end attached to a deployable apparatus;
   (c) whereby as said deployable apparatus is deployed, said linkage moves said limiting member into position to come in contact with a control mechanism which moves in a direction to regulate the speed of said utility vehicle, and as said deployable apparatus is retracted, said linkage moves said limiting member out of position to come in contact with said control mechanism; and
   (d) whereby the maximum speed of said utility vehicle with said limiting member in contact with said control mechanism is determined by the adjusted length of said linkage.

2. The device of claim 1, wherein said limiting member further comprises:
   (a) a limiting arm pivotably attached to said utility vehicle;
   (b) a lever arm attached to said limiting arm, said lever arm having a means for said first end of said linkage to pivotably attach.

3. The device of claim 2 wherein said means for said first end of said linkage to attach to said lever arm is an aperture in said lever arm for receiving said first end of said linkage.

4. The device of claim 3 wherein said first end of said linkage has a cylindrical element which pivots in said aperture of said lever arm, said cylindrical element having a means for retaining it in said aperture of said lever arm.

5. The device of claim 4 wherein said cylindrical element of said first end of said linkage has external threads, and said means for retaining said cylindrical element is a nut threadably engaged with said cylindrical element.

6. The device of claim 4 wherein said cylindrical element of said first end of said linkage has an aperture through it, and said means for retaining said cylindrical element is a cotter pin through said aperture.

7. The device of claim 4 wherein said cylindrical element of said first end of said linkage has an external groove, and said means for retaining said cylindrical element is a snap ring engaged in said groove.

8. The device of claim 2 wherein said limiting arm has a first end and a second end, said first end being pivotably attached to said utility vehicle, and said second end being adapted to contact said control mechanism.

9. The device of claim 2 wherein said limiting member further comprises a stop member attached to said limiting arm, said stop member being adapted to contact said control mechanism.

10. The device of claim 9 wherein said stop member is attached at an angle to said limiting arm such that when said limiting arm is in position to contact said control mechanism, said stop member is oriented in line with and approximately normal to said direction that said control mechanism moves.

11. The device of claim 9 wherein said stop member is a disk.

12. The device of claim 2 wherein an angle is formed between said limiting arm and said lever arm.

13. The device of claim 1 wherein said linkage further comprises:
   (a) a first member pivotably attached to said limiting member;
   (b) a second member pivotably attached to said deployable apparatus; and
   (c) an adjustment means connecting said first member to said second member.

14. The device of claim 13 wherein said adjustment means is cooperating threads.

15. A device for limiting the speed of a utility vehicle, comprising:
   (a) a limiting arm pivotably attached to said utility vehicle,
   (b) a lever arm attached at an angle to said limiting arm, said lever arm having an aperture,
   (c) a stop member attached to said limiting arm,
   (d) a linkage having
      (i) an adjustable length,
      (ii) a first member having a threaded element for adjusting said adjustable length, and having a cylindrical element which pivots in said aperture of said lever arm, said cylindrical element having external threads and a nut engaged on said threads for retaining said cylindrical element in said aperture,
      (iii) a second member pivotably attached to a deployable apparatus, said second member having a threaded element which cooperates with said threaded element of said first member for adjusting said adjustable length;
   (e) whereby as said deployable apparatus is deployed, said linkage moves said limiting arm into position to come in contact with a control mechanism which moves in a direction to regulate the speed of said utility vehicle, such that when said limiting arm is in position to contact said control mechanism, said stop member is oriented in line with and approximately normal to said direction that said control mechanism moves, and as said deployable apparatus is retracted, said linkage moves said limiting arm out of position to come in contact with said control mechanism; and
   (f) whereby the maximum speed of said utility vehicle with said stop member in contact with said mechanism is determined by the adjusted length of said linkage.

16. A mobile bunker raking apparatus, comprising:
   (a) a utility vehicle;
   (b) a deployable bunker rake attached to said utility vehicle;
   (c) a speed limiting device comprising (i) a limiting member;

(ii) a linkage having an adjustable length, a first end attached to said limiting member and a second end attached to said bunker rake;

(d) whereby as said bunker rake is deployed, said linkage moves said limiting member into position to come in contact with a control mechanism which moves in a direction to regulate the speed of said utility vehicle, and as said bunker rake retracted, said linkage moves said limiting member out of position to come in contact with said control mechanism; and (e) whereby the maximum speed of said utility vehicle with said limiting member in contact with said control mechanism is determined by the adjusted length of said linkage.

* * * * *